(12) United States Patent
Fujii

(10) Patent No.: US 10,078,245 B2
(45) Date of Patent: Sep. 18, 2018

(54) LIGHT FLUX CONTROLLING MEMBER HAVING A RECESSED INCIDENCE SURFACE AND ANNULAR GROOVE, LIGHT-EMITTING DEVICE, SURFACE LIGHT SOURCE DEVICE AND DISPLAY DEVICE

(71) Applicant: Enplas Corporation, Saitama (JP)

(72) Inventor: Yuki Fujii, Saitama (JP)

(73) Assignee: ENPLAS CORPORATION, Tokyo (JP)

( * ) Notice: Subject to any disclaimer, the term of this patent is extended or adjusted under 35 U.S.C. 154(b) by 60 days.

(21) Appl. No.: 15/409,832

(22) Filed: Jan. 19, 2017

(65) Prior Publication Data
US 2017/0212386 A1    Jul. 27, 2017

(30) Foreign Application Priority Data

Jan. 21, 2016 (JP) ................... 2016-009896

(51) Int. Cl.

| | | |
|---|---|---|
| *G02F 1/1335* | (2006.01) | |
| *F21V 3/02* | (2006.01) | |
| *F21V 13/04* | (2006.01) | |
| *F21Y 105/16* | (2016.01) | |
| *F21Y 115/10* | (2016.01) | |
| *F21V 5/04* | (2006.01) | |

(Continued)

(52) U.S. Cl.
CPC .......... *G02F 1/133611* (2013.01); *F21V 3/02* (2013.01); *F21V 13/04* (2013.01); *G02F 1/133603* (2013.01); *G02F 1/133606* (2013.01); *F21V 5/04* (2013.01); *F21V 7/0091* (2013.01); *F21V 7/048* (2013.01); *F21Y 2105/16* (2016.08); *F21Y 2115/10* (2016.08); *G02F 2001/133607* (2013.01)

(58) Field of Classification Search
CPC .. F21V 5/04; F21V 5/048; G02B 3/04; G02B 3/08; G02F 1/133607; G02F 1/133611; G02F 2001/133607
See application file for complete search history.

(56) References Cited

U.S. PATENT DOCUMENTS

| | | | | |
|---|---|---|---|---|
| 7,798,679 | B2* | 9/2010 | Kokubo | ................. F21V 5/048 362/335 |
| 8,251,547 | B2* | 8/2012 | Yamaguchi | .............. G02B 3/04 362/307 |
| 2017/0328537 | A1* | 11/2017 | Fukuda | ..................... F21V 5/04 |

FOREIGN PATENT DOCUMENTS

JP    2011-023204 A    2/2011

* cited by examiner

*Primary Examiner* — Robert May
(74) *Attorney, Agent, or Firm* — Brundidge & Stanger, P.C.

(57) ABSTRACT

A light flux controlling member includes an incidence surface, an emission surface, and an annular groove part. The annular groove part includes a first internal surface and a second internal surface. The second internal surface protrudes from a virtual line connecting an outer and inner end portions toward an opening side of the annular groove part; and, when an angle on the annular groove part side of two angles between a tangent to an arbitrary point of the second internal surface and the central axis is an inclination angle at the arbitrary point of the second internal surface in the cross section including the central axis, an inclination angle at the inner end portion is smaller than an inclination angle at the outer end portion, and an inclination angle of the second internal surface increases as a distance from the central axis increases.

7 Claims, 19 Drawing Sheets

(51) Int. Cl.
*F21V 7/00* (2006.01)
*F21V 7/04* (2006.01)

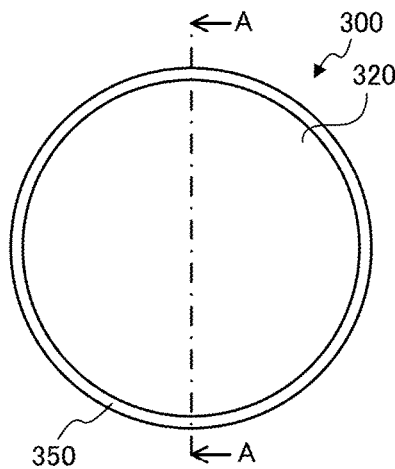
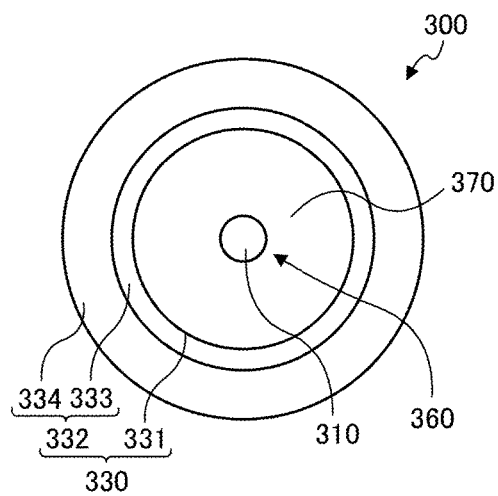
FIG. 9A     FIG. 9B
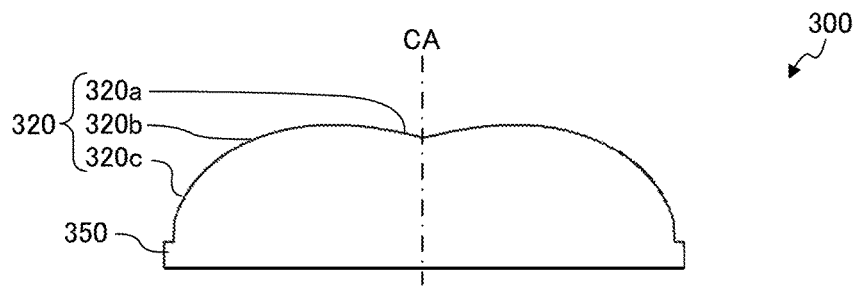
FIG. 9C
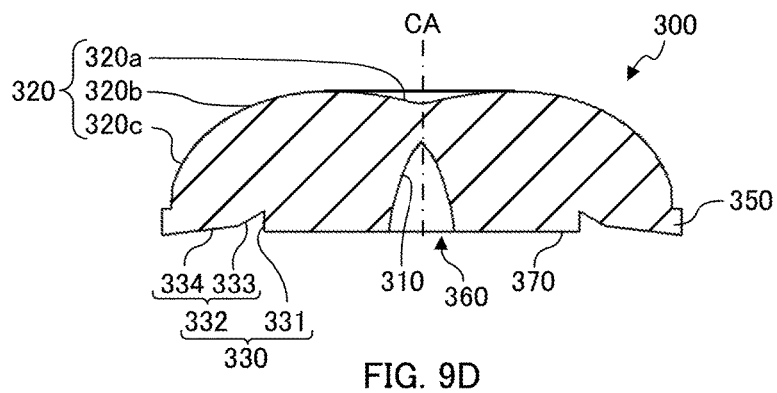
FIG. 9D

LIGHT FLUX CONTROLLING MEMBER HAVING A RECESSED INCIDENCE SURFACE AND ANNULAR GROOVE, LIGHT-EMITTING DEVICE, SURFACE LIGHT SOURCE DEVICE AND DISPLAY DEVICE

CROSS REFERENCE TO RELATED APPLICATIONS

This application is entitled to and claims the benefit of Japanese Patent Application No.2016-009896, filed on Jan. 21, 2016, the disclosure of which including the specification, drawings and abstract is incorporated herein by reference in its entirety.

TECHNICAL FIELD

The present invention relates to a light flux controlling member that controls a distribution of light emitted from a light emitting element, and to a light-emitting device, a surface light source device and a display device including the light flux controlling member.

BACKGROUND ART

Some transmission type image display apparatuses such as liquid crystal display apparatuses use a direct surface light source device as a backlight. In recent years, direct surface light source devices having a plurality of light emitting elements as the light source have been used.

For example, a direct surface light source device includes a substrate, a plurality of light emitting elements, a plurality of light flux controlling members (lenses) and a light diffusion member. Each of the light emitting elements is, for example, a light-emitting diode (LED) such as a white light-emitting diode. The light emitting elements are disposed on the substrate in a matrix. The light flux controlling member that spreads the light of the light emitting element in the surface direction of the substrate is disposed over each light emitting element. The light emitted from the light flux controlling member is diffused by the light diffusion member so as to illuminate an illumination member (for example, a liquid crystal panel) in a planar fashion.

FIGS. 1A to 1C illustrate a configuration of conventional light flux controlling member 20. FIG. 1A is a perspective view of light flux controlling member 20 as viewed from the rear side, FIG. 1B is a cross-sectional perspective view of light flux controlling member 20 as viewed from the rear side, and FIG. 1C is a sectional view thereof. It is to be noted that the leg part provided on the rear side is omitted in FIG. 1A and FIG. 1B. As illustrated in FIGS. 1A to 1C, conventional light flux controlling member 20 includes incidence surface 22 on which light emitted from a light emitting element is incident, and emission surface 24 configured to emit light incident on incidence surface 22 to the outside. Incidence surface 22 is a surface recessed with respect to the light emitting element, and is formed to face the light emitting surface of the light emitting element.

FIGS. 2A and 2B illustrate light paths of light flux controlling member 20. FIG. 2A illustrates light paths of light beams emitted from a light emission center of light emitting element 10 at an emission angle of 30 degrees, and FIG. 2B illustrates light paths of light beams emitted from a light emission center of light emitting element 10 at an emission angle of 40 degrees. Here, the "emission angle" is an angle (θ in FIG. 2A) of a light beam to optical axis OA of light emitting element 10. It is to be noted that the leg part provided on the rear side is omitted in FIGS. 2A and 2B.

As illustrated in FIGS. 2A and 2B, light emitted from light emitting element 10 enters light flux controlling member 20 from incidence surface 22. The light having entered light flux controlling member 20 reaches emission surface 24 and is emitted from emission surface 24 to the outside (solid line arrow). At this time, the light is refracted by the shape of emission surface 24, and accordingly the travelling direction of the light is controlled. Meanwhile, a part of the light having reached emission surface 24 is internally reflected (fresnel-reflected) at emission surface 24 and reaches rear surface 26 opposite to the substrate on which light emitting element 10 is mounted (broken line arrow). When the light having reached rear surface 26 is reflected at rear surface 26, the light travelling toward a part just above light flux controlling member 20 is excessively increased, and consequently non-uniformity of the distribution (luminance unevenness) of the luminance of the light emitted from the light-emitting device is caused. In addition, when the light having reached rear surface 26 is emitted from rear surface 26, the light is absorbed by the substrate, and therefore loss of light is large. In view of this, PTL 1 proposes a light flux controlling member for solving the above-mentioned problems.

FIGS. 3A to 3C illustrate a configuration of light flux controlling member 30 disclosed in PTL 1. FIG. 3A is a perspective view of light flux controlling member 30 as viewed from the rear side, FIG. 3B is a cross-sectional perspective view of light flux controlling member 30 as viewed from the rear side, and FIG. 3C is a sectional view thereof. It is to be noted that the leg part provided on the rear side is omitted in FIGS. 3A and 3B. As illustrated in FIGS. 3A to 3C, in light flux controlling member 30 disclosed in PTL 1, a recess is formed on rear surface 26. The recess includes inclined surface 32 which is provided on the outer side, and parallel surface 34 which is substantially parallel to central axis CA and is provided on the inner side. Inclined surface 32 is rotationally symmetrical (circularly symmetrical) about central axis CA of light flux controlling member 30, and is tilted at a predetermined angle (for example, 45 degrees) to a virtual line orthogonal to central axis CA.

FIGS. 4A and 4B illustrate light paths of light flux controlling member 30. FIG. 4A illustrates light paths of light beams emitted from a light emission center of light emitting element 10 at an emission angle of 30 degrees, and FIG. 4B illustrates light paths of light beams emitted from a light emission center of light emitting element 10. It is to be noted that the leg part provided on the rear side is omitted also in FIGS. 4A and 4B. As illustrated in FIGS. 4A and 4B, light fresnel-reflected at emission surface 24 reaches a predetermined portion of rear surface 26. By forming inclined surface 32 in the above-mentioned predetermined portion, at least a part of the light reaching inclined surface 32 can be reflected in the lateral direction (see FIGS. 4A and 4B).

In this manner, in light flux controlling member 30 disclosed in PTL 1, light reflected at emission surface 24 is not easily directed toward a part just above light flux controlling member 30, and is not easily absorbed by the substrate. Accordingly, a light-emitting device having light flux controlling member 30 disclosed in PTL 1 can uniformly and efficiently emit light in comparison with a conventional light-emitting device having light flux controlling member 20.

In addition, in recent years, LEDs of chip-on-board (COB) type have been used for illumination since such LEDs can be easily mounted, and have high light emission efficiency. The LEDs of COB type are known to emit more light in the lateral direction in addition to the upper direction, in comparison with conventional LEDs.

CITATION LIST

Patent Literature

PTL 1
Japanese Patent Application Laid-Open No. 2011-23204

SUMMARY OF INVENTION

Technical Problem

In light flux controlling member 30 disclosed in PTL 1, the planar dimension of inclined surface 32 is required to be increased to reflect a large part of light internally reflected at emission surface 24 in the lateral direction. However, the height of parallel surface 34 has to be increased to increase the planar dimension of inclined surface 32. When the height of parallel surface 34 is increased, light emitted from light emitting element 10 at a large emission angle undesirably reaches parallel surface 34. The light reaching parallel surface 34 passes through parallel surface 34 and is, depending on the state of parallel surface 34, scattered. Further, the light having passed through parallel surface 34 is refracted at inclined surface 32, and is advanced in a direction toward a region around an upper part of light flux controlling member 30, thus causing luminance unevenness. In addition, when an LED of COB type is used as light emitting element 10, a part of light emitted in the lateral direction of the LED undesirably reaches parallel surface 34. As described above, the light reaching parallel surface 34 is scattered, or advanced in a direction toward a region around an upper part of the light flux controlling member 30, thus causing luminance unevenness.

On the other hand, by increasing the inclination angle of inclined surface 32 to central axis CA, the planar dimension of inclined surface 32 may be increased without increasing the height of parallel surface 34. When the inclination angle of inclined surface 32 to central axis CA is increased in this manner, however, the light substantially perpendicularly incident on inclined surface 32 from emission surface 24 is reflected toward a region around the upper part of light-emitting device, and luminance unevenness is caused.

As described, in conventional light flux controlling member 30, the quantity of light directed toward a region around the upper part of light flux controlling member 30 is excessive due to scattering at parallel surface 34, refraction at inclined surface 32, or reflection at inclined surface 32, and luminance unevenness is caused.

An object of the present invention is to provide a light flux controlling member in which luminance unevenness of emission light is not easily caused.

Another object of the present invention is to provide a light-emitting device, a surface light source device, and a display device including the light flux controlling member.

Solution to Problem

To achieve the above-mentioned object, a light flux controlling member of the embodiments of the present invention is configured to control a distribution of light emitted from a light emitting element, the light flux controlling member including: an incidence surface on which light emitted from the light emitting element is incident, the incidence surface being an internal surface of a recess formed on a rear side to intersect a central axis of the light flux controlling member; an emission surface formed on a front side to intersect the central axis, and configured to emit light incident on the incidence surface to outside of the light flux controlling member; and an annular groove part formed on the rear side to surround the incidence surface. The annular groove part includes a first internal surface disposed on the central axis side, and a second internal surface disposed at a position remote from the central axis relative to the first internal surface; the second internal surface protrudes from a virtual line connecting an outer end portion and an inner end portion of the second internal surface toward a side of an opening of the annular groove part in a cross section including the central axis; and, when an angle on the annular groove part side of two angles between a tangent to an arbitrary point of the second internal surface and the central axis is an inclination angle at the arbitrary point of the second internal surface in the cross section including the central axis, an inclination angle at the inner end portion of the second internal surface is smaller than an inclination angle at the outer end portion of the second internal surface, and an inclination angle of the second internal surface increases continuously or stepwise as a distance from the central axis increases.

To achieve the above-mentioned object, a light-emitting device of the embodiments the present invention includes: a light emitting element; and the light flux controlling member. The central axis coincides with an optical axis of the light emitting element.

To achieve the above-mentioned object, a surface light source device of the embodiments the present invention includes: the light-emitting device; and a light diffusion member configured to allow light from the light-emitting device to pass therethrough while diffusing the light.

To achieve the above-mentioned object, a display device of the embodiments the present invention includes: the surface light source device according to claim 6; and a display member to which light emitted from the surface light source device is applied.

Advantageous Effects of Invention

With the light flux controlling member of the embodiments of the present invention, luminance unevenness of emission light is not easily caused. In addition, the light-emitting device, the surface light source device and the display device of the embodiments of the present invention include the light flux controlling member in which luminance unevenness of emission light is not easily caused, and therefore luminance unevenness of emission light is not easily caused with the light-emitting device, the surface light source device and the display device.

BRIEF DESCRIPTION OF DRAWINGS

FIGS. 9A to 9D illustrate a configuration of the light flux controlling member according to the embodiment of the present invention;

DESCRIPTION OF EMBODIMENTS

In the following, a light flux controlling member, a light-emitting device, a surface light source device and a display device of embodiments of the present invention are described in detail with reference to the accompanying drawings. In the following description, as a typical example of the surface light source device according to the embodiments of the present invention, a surface light source device suitable for a backlight of a liquid crystal display apparatus will be described. When used with a member (for example, a liquid crystal panel) configured to be irradiated with light from the surface light source device, the surface light source device can be used as a display apparatus.

Embodiment 1

(Configurations of Surface Light Source Device and Light-emitting Device)

Figure 1A:
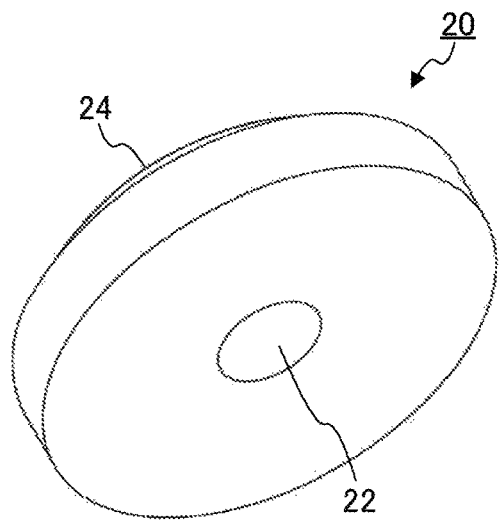
FIGS. 1A to 1C illustrate a configuration of a conventional light flux controlling member.
Figure 1B:
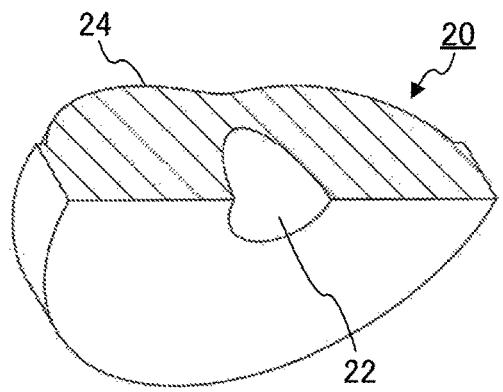
Figure 1C:
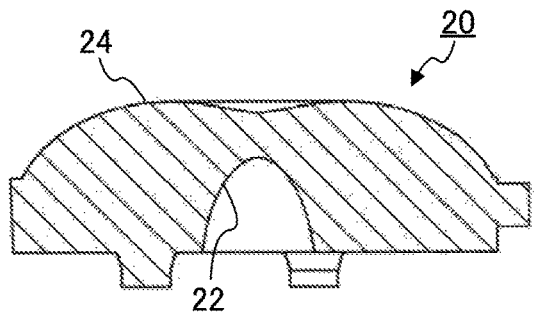
Figure 2A:
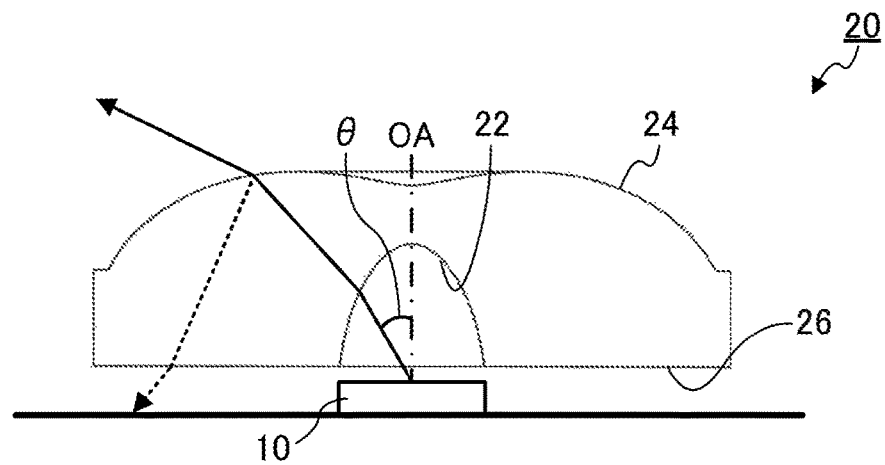
FIGS. 2A and 2B illustrate light paths of the light flux controlling member illustrated in FIGS. 1A to 1C.
Figure 2B:
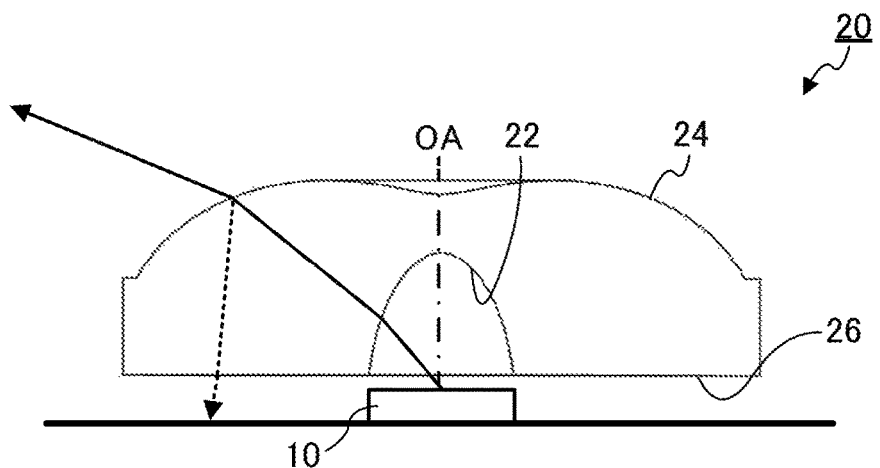
Figure 3A:
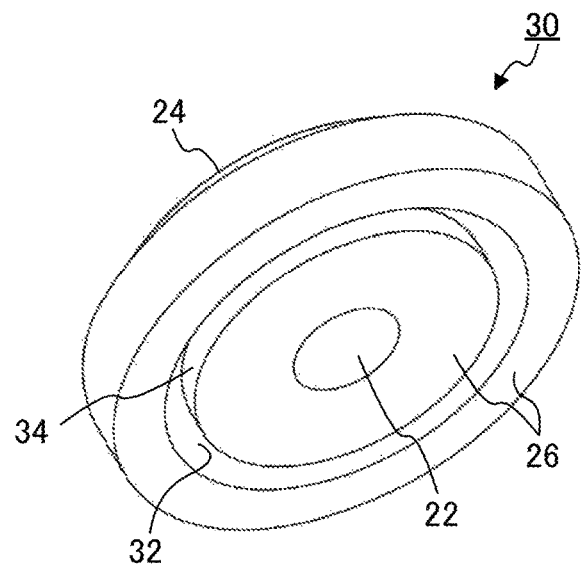
FIGS. 3A to 3C illustrate a configuration of a light flux controlling member disclosed in PTL 1.
Figure 3B:
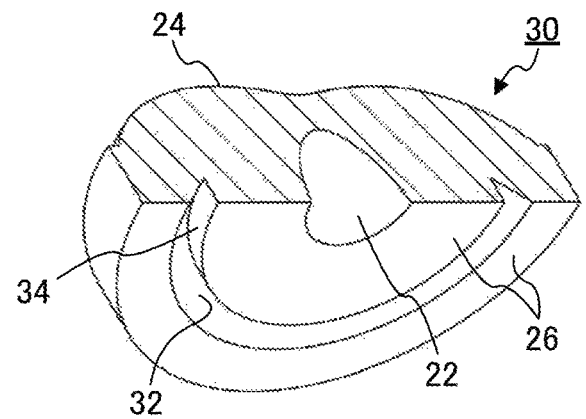
Figure 3C:
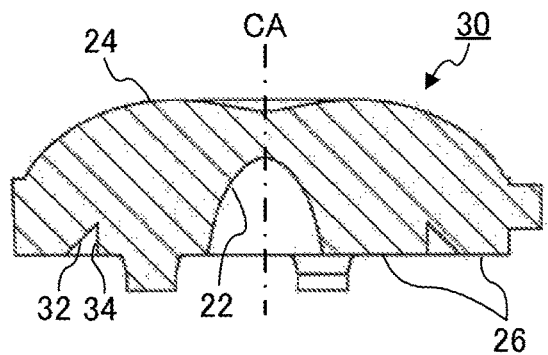
Figure 4A:
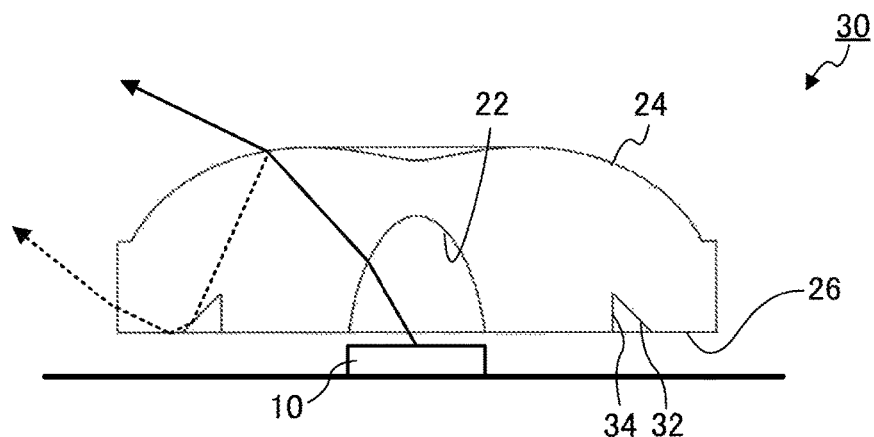
FIGS. 4A and 4B illustrate light paths of the light flux controlling member illustrated in FIGS. 3A to 3C.
Figure 4B:
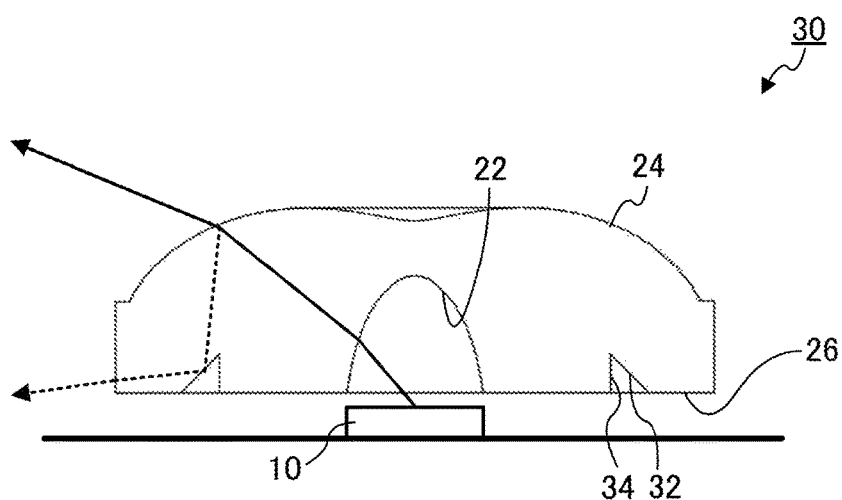
Figure 5A:
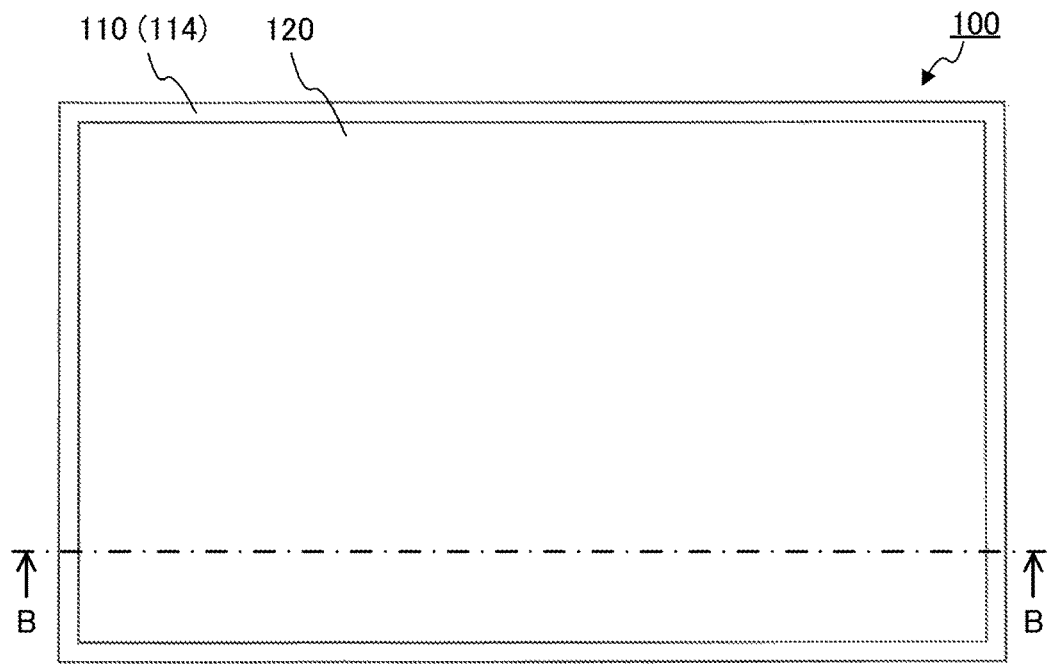
FIGS. 5A and 5B illustrate a configuration of a surface light source device according to an embodiment of the present invention.
Figure 5B:
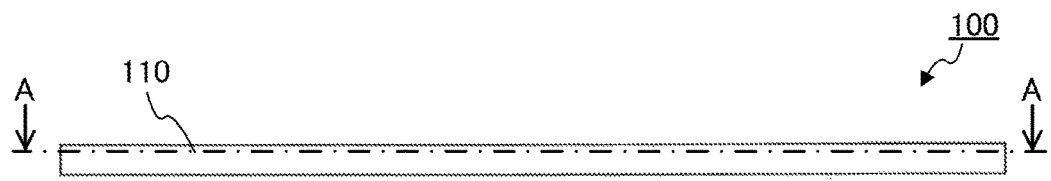
Figure 6A:
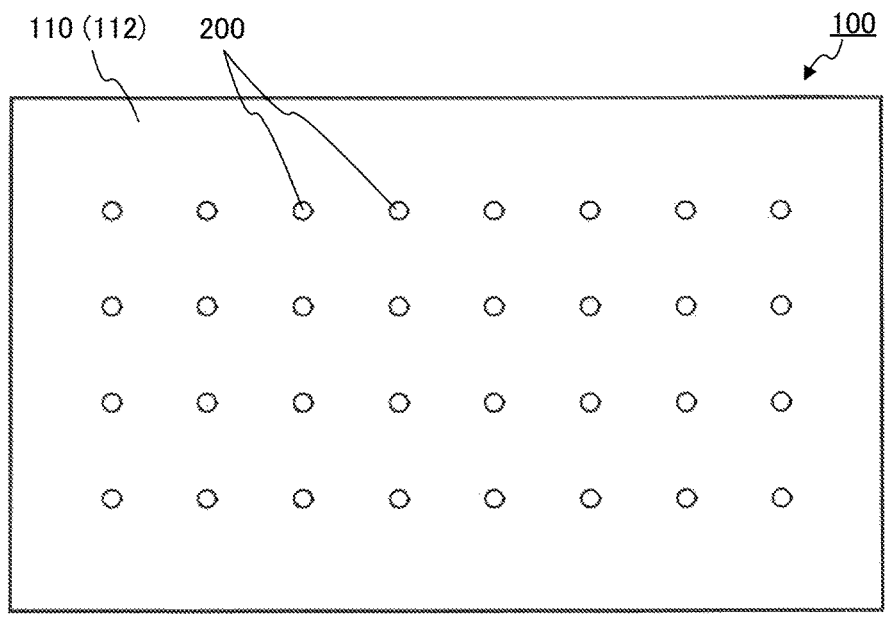
FIGS. 6A and 6B are sectional views of the surface light source device according to the embodiment of the present invention.
Figure 6B:
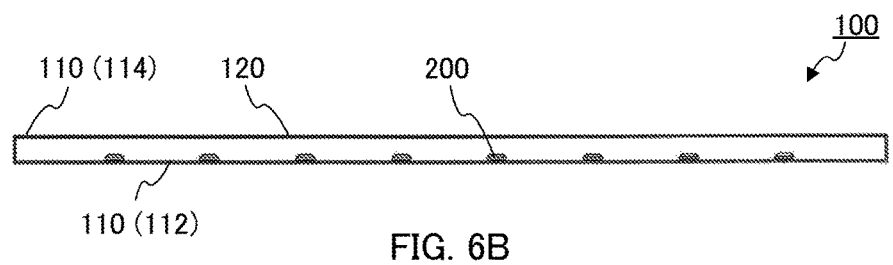
Figure 7A:
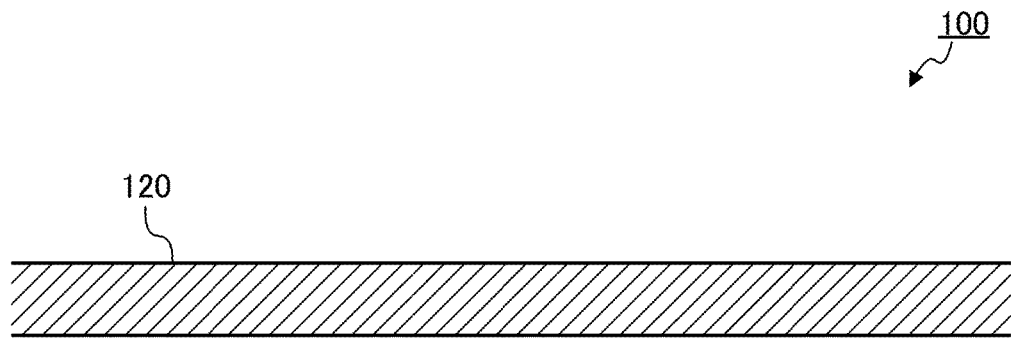
FIGS. 7A and 7B are partially enlarged sectional view of FIG. 6B.
Figure 7B:
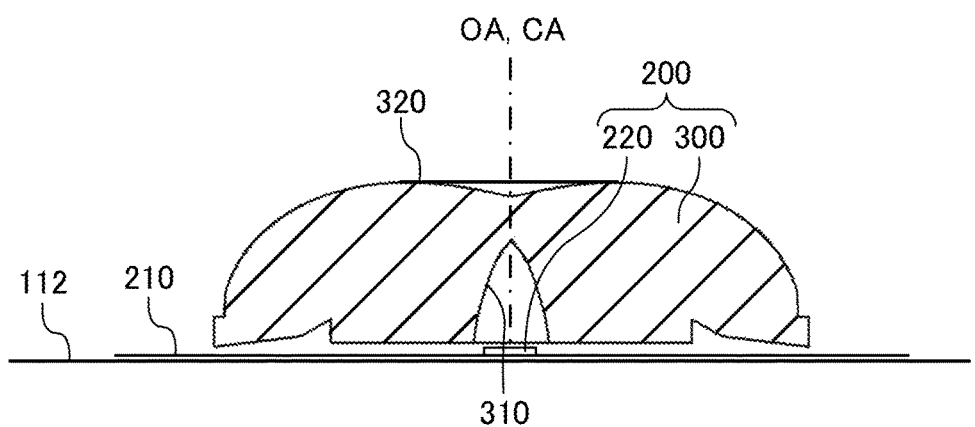

FIG. 5A to FIG. 7B illustrate a configuration of surface light source device 100 according to Embodiment 1 of the present invention. FIG. 5A is a plan view of surface light source device 100, and FIG. 5B is a front view of surface light source device 100. FIG. 6A is a sectional view taken along line A-A of FIG. 5B, and FIG. 6B is a sectional view taken along line B-B of FIG. 5A. FIG. 7 is a partially enlarged sectional view of FIG. 6B. It is to be noted that the leg part is omitted in FIG. 7.

As illustrated in FIG. 5A to FIG. 7B, surface light source device 100 includes casing 110, a plurality of light-emitting devices 200, and light diffusion member 120. Light-emitting devices 200 are disposed in a matrix on bottom plate 112 of casing 110. The internal surface of bottom plate 112 functions as a diffusive reflection surface. In addition, top plate 114 of casing 110 is provided with an opening. Light diffusion member 120 is disposed to cover the opening, and functions as a light emitting surface. The light emitting surface has a size of, for example, approximately 400 mm×approximately 700 mm.

As illustrated in FIGS. 6A and 6B, light-emitting devices 200 are fixed on substrate 210. A plurality of substrates 210 are fixed at respective predetermined positions on bottom plate 112 of casing 110. As illustrated in FIGS. 7A and 7B, each light-emitting device 200 includes light emitting element 220 and light flux controlling member 300.

Light emitting element 220 is a light source of surface light source device 100, and is mounted on substrate 210. Light emitting element 220 is a light-emitting diode (LED) such as a white light-emitting diode, for example. Preferably, light emitting element 220 is an LED of chip-on-board (COB) type from the viewpoint of the ease of mounting and high light emission efficiency.

LEDs of COB type are known to emit a greater quantity of light in the lateral direction in comparison with conventional LEDs. The top surface of light emitting element 220 may be located above the lower end of recess 360 (described later) of light flux controlling member 300 or below the lower end of recess 360 in the vertical direction. In the present embodiment, the top surface of light emitting element 220 is located below the lower end of recess 360 (described later) of light flux controlling member 300 in the vertical direction.

As illustrated in FIGS. 7A and 7B, light flux controlling member 300 is fixed on substrate 210. Light flux controlling member 300 controls light emitted from light emitting element 220 in such a manner as to spread the light. Light flux controlling member 300 is disposed over light emitting element 220 such that central axis CA of light flux controlling member 300 coincides with optical axis OA of light emitting element 220. It is to be noted that each of incidence surface 310 and emission surface 320 of light flux controlling member 300 described later is rotationally symmetrical (circularly symmetrical). In addition, the rotation axis of incidence surface 310 of light flux controlling member 300 and the rotation axis of emission surface 320 of light flux controlling member 300 coincide with each other. Here, "central axis CA" means the rotation axis of incidence surface 310 and emission surface 320. In addition, "optical axis OA" means a central light beam of a stereoscopic emission light flux from light emitting element 220.

Light flux controlling member 300 can be formed by integral molding. The material of light flux controlling member 300 is not limited as long as light of a desired wavelength can pass therethrough. For example, the material of light flux controlling member 100 is a light transmissive resin such as polymethylmethacrylate (PMMA), polycarbonate (PC), epoxy resin (EP); and silicone resin, or glass.

Surface light source device 100 according to the embodiment of the present invention is characterized mainly by the configuration of light flux controlling member 300. Therefore, light flux controlling member 300 will be separately described in detail.

Light diffusion member 120 is a plate-shaped member having a light diffusing property, and allows the light emitted from light-emitting device 200 to pass therethrough while diffusing the light. Normally, the size of light diffusion member 120 is substantially the same as that of the member to be irradiated such as a liquid crystal panel. For example, light diffusion member 120 is formed of a light transmissive resin such as polymethylmethacrylate (PMMA), polycarbonate (PC), polystyrene (PS), and styrene methyl methacrylate copolymerization resin (MS). For the purpose of providing a light diffusing property, minute irregularities are formed on the surface of light diffusion member 120, or diffusing members such as beads are dispersed in light diffusion member 120.

In surface light source device 100 according to the embodiment of the present invention, the light emitted from light emitting elements 220 are spread by respective light flux controlling members 300 so as to illuminate light diffusion member 120 over a wide range. The light emitted from each light flux controlling member 300 is further diffused by light diffusion member 120. As a result, surface light source device 100 according to the embodiment of the present invention can uniformly illuminate a planar member (for example, a liquid crystal panel).

(Configuration of Light Flux Controlling Member)

Figure 8:
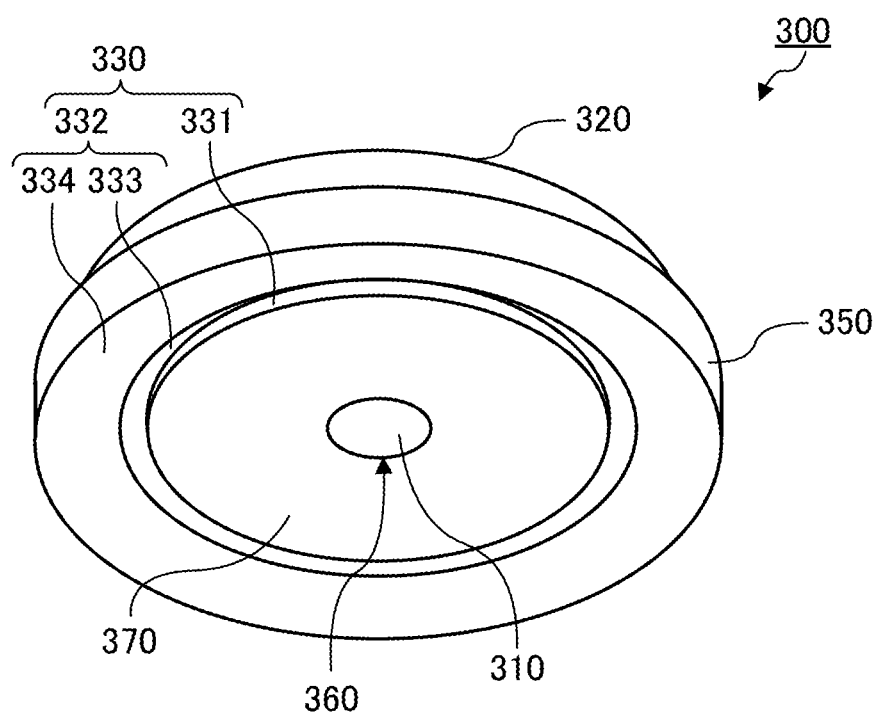
FIG. 8 is a perspective view of the light flux controlling member according to the embodiment of the present invention as viewed from the rear side.

FIG. 8 and FIGS. 9A to 9D illustrate a configuration of light flux controlling member 300 according to the present embodiment. FIG. 8 is a perspective view of light flux controlling member 300 as viewed from the rear side (substrate 210 side). FIG. 9A is a plan view of light flux controlling member 300, FIG. 9B is a bottom view of light flux controlling member 300, FIG. 9C is a front view of light flux controlling member 300, and FIG. 9D is a sectional view taken along line A-A of FIG. 9A.

As illustrated in FIG. 8 and FIGS. 9A to 9D, light flux controlling member 300 includes incidence surface 310, emission surface 320, annular groove part 330 and flange part 350. In addition, although not illustrated in the drawings, light flux controlling member 300 may include a plurality of leg parts.

Incidence surface 310 is an internal surface of recess 360 that is formed at a center portion on the rear side (light emitting element 220 side) in such a manner as to intersect central axis CA of light flux controlling member 300. Incidence surface 310 allows most or all of light emitted from light emitting element 220 to enter light flux controlling member 300 while controlling the travelling direction of the light. Incidence surface 310 intersects central axis CA of light flux controlling member 300, and is rotationally symmetrical (circularly symmetrical) about central axis CA.

Emission surface 320 is formed on the front side (light diffusion member 120 side) of light flux controlling member 300 in such a manner as to protrude from flange part 350. Emission surface 320 emits the light having entered light flux controlling member 300 to the outside while controlling the travelling direction of the light. Emission surface 320 intersects central axis CA, and is rotationally symmetrical (circularly symmetrical) about central axis CA.

Emission surface 320 includes first emission surface 320a located in a predetermined range around central axis CA, second emission surface 320b continuously formed at the periphery of first emission surface 320a, and third emission surface 320c that connects second emission surface 320b and flange part 350 (see FIG. 9D). First emission surface 320a is a curved surface protruding toward the rear side. Second emission surface 320b is a smooth curved surface located at the periphery of first emission surface 320a and protruding toward the front side. Second emission surface 320b has an annular protruding shape. Third emission surface 320c is a curved surface located at the periphery of second emission surface 320b. In the cross section of FIG. 9D, third emission surface 320c may have a linear shape, or a curved shape.

Annular groove part 330 is formed on the rear side of light flux controlling member 300 in such a manner as to surround recess 360 (incidence surface 310). Annular groove part 330 is rotationally symmetrical about central axis CA. Annular groove part 330 includes first internal surface 331 disposed on central axis CA side, and second internal surface 332 disposed at a position remote from central axis CA relative to first internal surface 331. In addition, rear surface 370 is disposed in a region between incidence surface 320 (recess 360) and annular groove part 330. Rear surface 370 is located at the rear side (substrate 210 side) of light flux controlling member 300, and extends from the opening edge part of recess 360 in the radial direction.

First internal surface 331 may be disposed such that first internal surface 331 is parallel to central axis CA or may be disposed such that first internal surface 331 approaches the front side as the distance from central axis CA increases. In the present embodiment, first internal surface 331 is parallel to central axis CA. That is, first internal surface 331 has a cylindrical shape.

Second internal surface 332 is formed on the rear side of light flux controlling member 300 in such a manner as to surround first internal surface 331. The inclination angle of second internal surface 332 to central axis CA increases continuously or stepwise as the distance from central axis CA increases. Second internal surface 332 may be one curved surface, or may be composed of a plurality of curved surfaces. In the present embodiment, second internal surface 332 is composed of a plurality of curved surfaces. To be more specific, second internal surface 332 includes inner second internal surface 333 disposed on central axis CA side, and outer second internal surface 334 disposed at a position remote from central axis CA relative to inner second internal surface 333. In the cross section including central axis CA, second internal surface 332 protrudes toward the opening side of annular groove part 330 from a virtual line connecting the outer end portion and the inner end portion.

First internal surface 331 and second internal surface 332 may be continuously formed. When first internal surface 331 and second internal surface 332 are continuously formed, annular groove part 330 has a substantially V-shape in the cross section including central axis CA. In addition, third internal surface may be formed between first internal surface 331 and second internal surface 332. When a third surface is formed between first internal surface 331 and second internal surface 332, annular groove part 330 has a substantially trapezoidal shape whose upper bottom (the side on the front side) has a smaller length in the cross section including central axis CA.

In the cross section including central axis CA, inner second internal surface 333 and outer second internal surface 334 may have a linear shape or a curved shape protruding toward the rear side. In the present embodiment, each of inner second internal surface 333 and outer second internal surface 334 has a linear shape in the cross section including central axis CA. That is, in the present embodiment, each of inner second internal surface 333 and outer second internal surface 334 has a shape of a side surface of a truncated conical shape.

Each of inner second internal surface 333 and outer second internal surface 334 is tilted to central axis CA. Each of inner second internal surface 333 and outer second internal surface 334 is tilted such that the distance to the rear side decreases as the distance from central axis CA increases. The inclination angle of inner second internal surface 333 to central axis CA is smaller than the inclination angle of outer second internal surface 334 to central axis CA. Here, when inner second internal surface 333 has a linear shape in the cross section including central axis CA, the "inclination angle" is the smaller angle on annular groove part 330 side of the two angles between the extension of inner second internal surface 333 and central axis CA in the cross section including central axis CA. In addition, when inner second internal surface 333 has a curved shape in the cross section including central axis CA, the "inclination angle" is the smaller angle on the annular groove part 330 side of the two angles between the tangent to the curve and central axis CA.

The inclination angle of inner second internal surface 333 and the inclination angle of outer second internal surface 334 are angles at which at least a part of light having entered light flux controlling member 300 from incidence surface 310 and internally reflected (fresnel-reflected) at emission surface 320 is reflected in the lateral direction. When the inclination angle to central axis CA of inner second internal surface 333 or outer second internal surface 334 is smaller than 25 degrees, the light internally reflected at emission surface 320 may possibly be reflected toward substrate 210 without being advanced in the lateral direction. In addition, most of the light internally reflected at emission surface 320 may not possibly arrive. On the other hand, when the inclination angle to central axis CA of inner second internal surface 333 or outer second internal surface 334 is greater than 50 degrees, the light arrived at inner second internal surface 333 may possibly pass therethrough.

As described above, the inclination angle of inner second internal surface 333 to central axis CA is smaller than the inclination angle of outer second internal surface 334 to central axis CA.

By providing the difference between the inclination angle of inner second internal surface 333 to central axis CA and the inclination angle of outer second internal surface 334 to central axis CA as described above, the light arrived at inner second internal surface 333 and the light arrived at outer second internal surface 334 can be reflected in directions different from each other. It is thus possible to reduce luminance unevenness which is caused when the light fresnel-reflected at emission surface 320 is further reflected at substrate 210, and reduce loss of light which is caused when the light is absorbed at substrate 210.

From the viewpoint of further directing the light to the lateral direction, second internal surface 332 is provided in a region where the light having entered light flux controlling member 300 from incidence surface 310 and internally reflected (fresnel-reflected) at emission surface 320 arrives, for example. The light path through which the light incident on incidence surface 310 is internally reflected at emission surface 320 and reaches the rear side of light flux controlling member 300 can be determined through a simulation.

Figure 10:
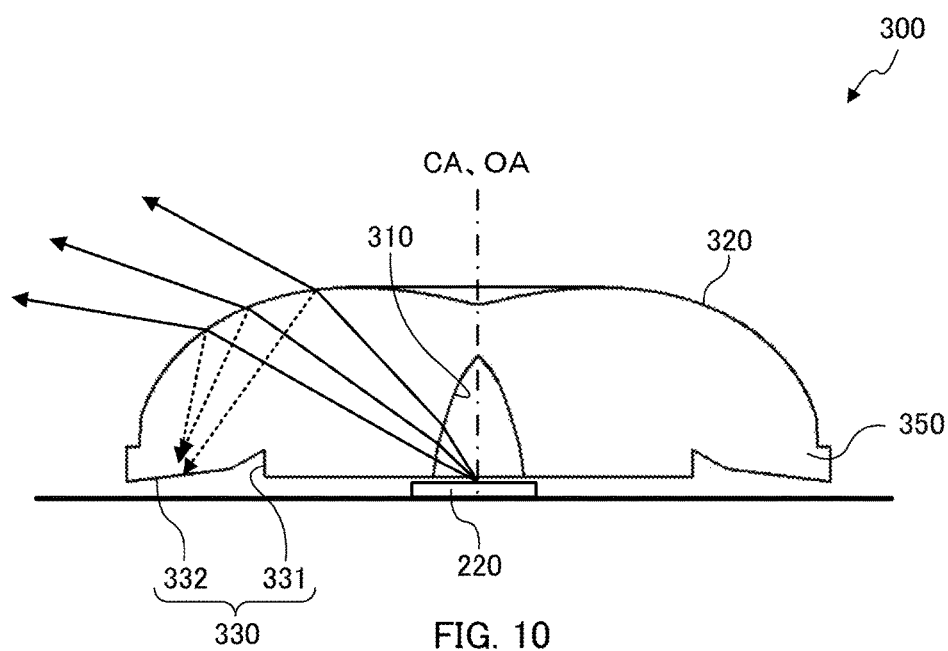
FIG. 10 illustrates light paths of the light flux controlling member.

FIG. 10 illustrates light paths of light flux controlling member 300. FIG. 10 illustrates light paths of light beams emitted from the emission center of light emitting element 220 at 30, 45, and 60 degrees. In addition, in FIG. 10, hatching is omitted to illustrate the light paths. As illustrated in FIG. 10, in light flux controlling member 300, light reflected by emission surface 320 reaches a predetermined region of the rear side of light flux controlling member 300. The region where the light having entered light flux controlling member 300 from incidence surface 310 reaches after being internally reflected by emission surface 320 can be set to a region which includes regions determined by a simulation where most of the light paths of light beams emitted at different angles arrive, for example.

Flange part 350 is located between the outer periphery part of emission surface 320 and the outer periphery part of the rear side of light flux controlling member 300, and flange part 350 radially outwardly protrude. Flange part 350 has a substantially annular shape. Flange part 350 is not an essential component; however, by providing flange part 350, the ease of the handling and alignment of light flux controlling member 300 is increased. The thickness of flange part 350 may be determined in consideration of the planar dimension required for emission surface 320, and the workability of flange part 350.

A plurality of arbitrarily formed leg parts protrude from the rear side of light flux controlling member 300. The shape of the leg part is not limited, and the leg part is a member having a substantially columnar shape. The leg parts support light flux controlling member 300 at appropriate positions with respect to light emitting element 220.

Figure 11:
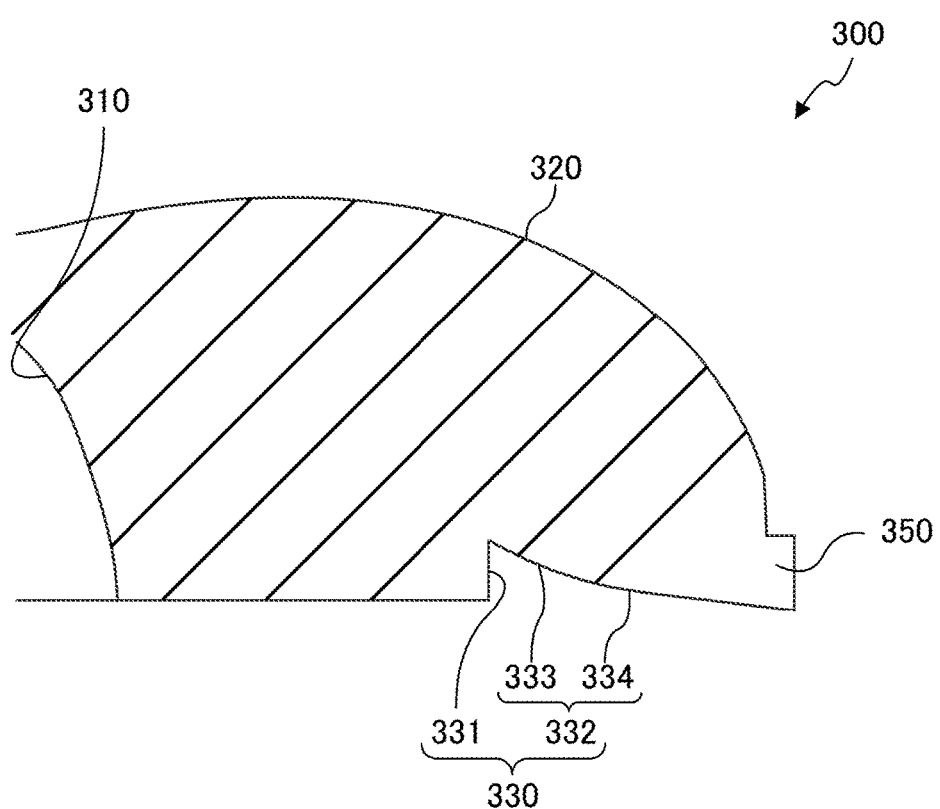
FIG. 11 is a sectional view of another light flux controlling member of Embodiment 1.

It is to be noted that, as illustrated in FIG. 11, inner second internal surface 333 may have a curved shape protruding toward the rear side in the cross section including central axis CA. That is, the inclination angle of second internal surface 332 to central axis CA may continuously increase as the distance from central axis CA increases.

Modification 1

Light flux controlling member 400 of Embodiment 1 may be further provided with a prism structure (projected line) for increasing light reflection efficiency at second internal surface 332.

Figure 12:
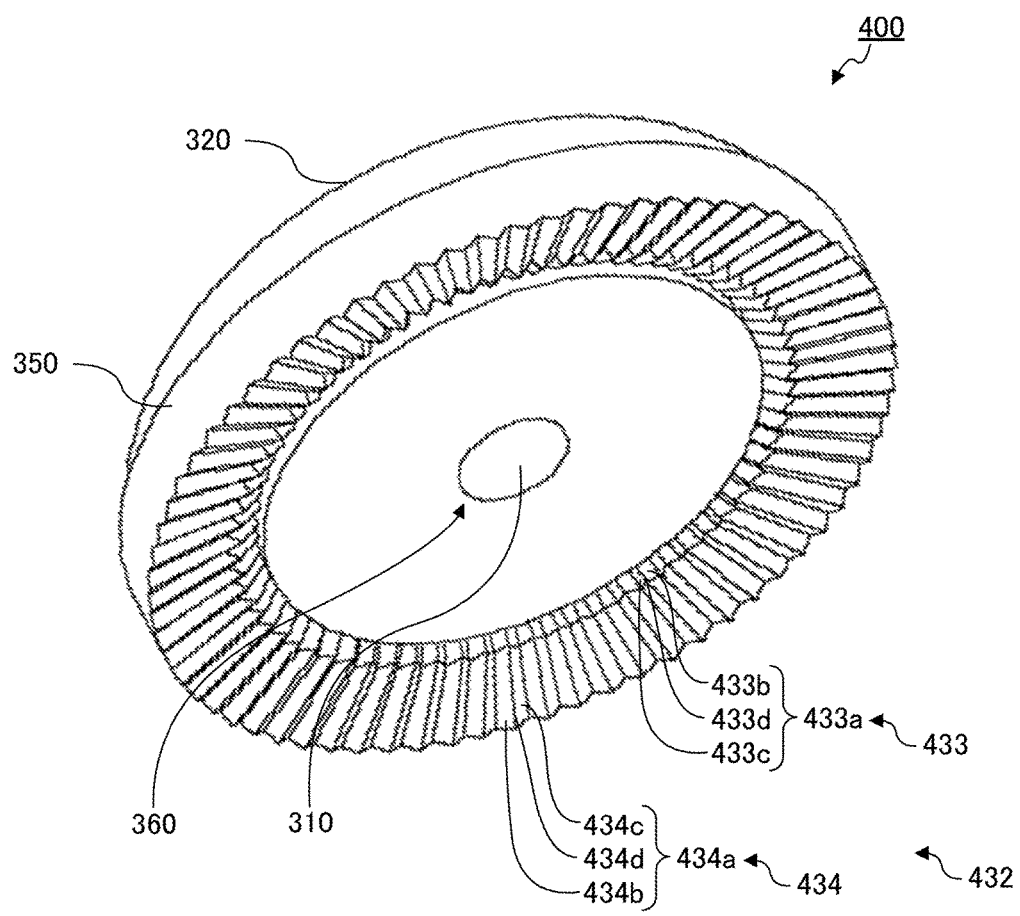
FIG. 12 illustrates a configuration of a light flux controlling member according to Modification 1 of Embodiment 1.

FIG. 12 is a perspective view of light flux controlling member 400 according to a modification of Embodiment 1. Light flux controlling member 400 according to the modification of Embodiment 1 is different from light flux controlling member 300 in that a plurality of projected lines 433 and 434 are disposed at second internal surface 432. Therefore, the same components as those of light flux controlling member 300 are denoted by the same reference numerals, and the descriptions thereof are omitted.

As illustrated in FIG. 12, on inner second internal surface 433 of light flux controlling member 400 according to the modification of Embodiment 1, a plurality of inner projected lines 433a are disposed. Inner projected line 433a includes inner first reflection surface 433b having a planar shape, inner second reflection surface 433c having a planar shape, and inner ridgeline 433d that is an intersection line between inner first reflection surface 433b and inner second reflection surface 433c. Inner projected line 433a has a substantially triangular shape in the cross section perpendicular to inner ridgeline 433d. In addition, although not illustrated in the drawings, a virtual line including inner ridgeline 433d intersects central axis CA at a position on the front side relative to inner ridgeline 433d. Inner projected line 433a acts as a total reflection prism, and further reflects light having internally reflected at emission surface 320 and reached second internal surface 332 in the lateral direction of light flux controlling member 400.

In addition, on outer second internal surface 434, a plurality of outer projected lines 434a are disposed. Outer projected line 434a includes outer reflection surface 434b having a planar shape, outer second reflection surface 434c having a planar shape, and outer ridgeline 434d that is an intersection line between outer first reflection surface 434b and outer second reflection surface 434c. Outer projected line 434a has a substantially triangular shape in the cross section perpendicular to outer ridgeline 434d. In addition, although not illustrated in the drawings, a virtual line including outer ridgeline 434d intersects central axis CA at a position on the front side relative to outer ridgeline 434d. Outer projected line 434a acts as a total reflection prism, and further reflects light having internally reflected at emission surface 320 and reached second internal surface 432 in the lateral direction of light flux controlling member 400.

(Simulation)

Next, the light paths in light flux controlling member 400 according to the modification of the present embodiment and the luminance distribution in surface light source device 100 using light flux controlling member 400 were simulated. For comparison, the light paths in light flux controlling member 500 illustrated in FIG. 13 (hereinafter referred to also as "light flux controlling member according to the comparative example") and the luminance distribution in a surface light source device using light flux controlling member 500 according to the comparative example (hereinafter referred to also as "surface light source device according to the comparative example") were also simulated in the same manner.

Figure 13:
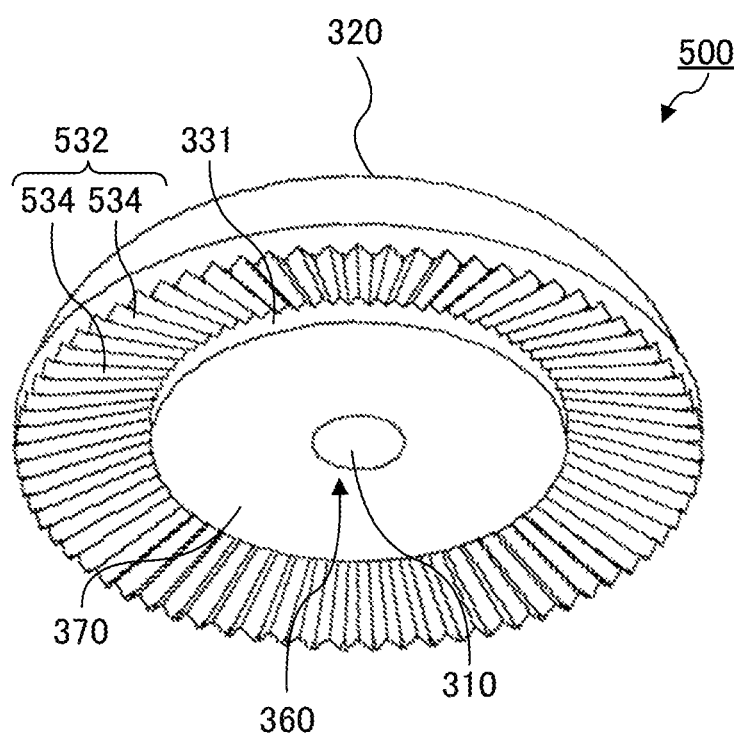
FIG. 13 is a perspective view of a light flux controlling member according to a comparative example as viewed from the rear side.

FIG. 13 is a perspective view of the light flux controlling member according to the comparative example as viewed from the rear side. As illustrated in FIG. 13, second internal surface 532 of light flux controlling member 500 according to the comparative example includes a plurality of projected lines 534. In addition, the inclination angle of second internal surface 532 (projected line 534) to central axis CA is constant. To be more specific, in the cross section including central axis CA, the angle between a virtual line including second internal surface 532 (projected line 534) and central axis CA is constant. It is to be noted that the other configurations are similar to those of light flux controlling member 300 according to the modification of Embodiment 1.

Figure 14A:
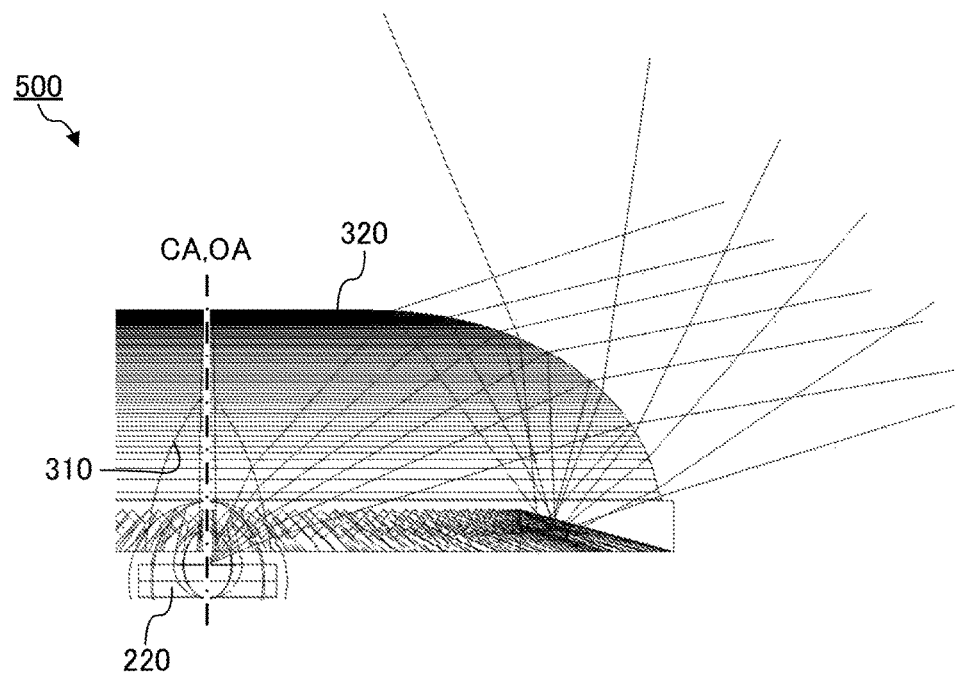
FIGS. 14A and 14B illustrate a simulation of light paths.
Figure 14B:
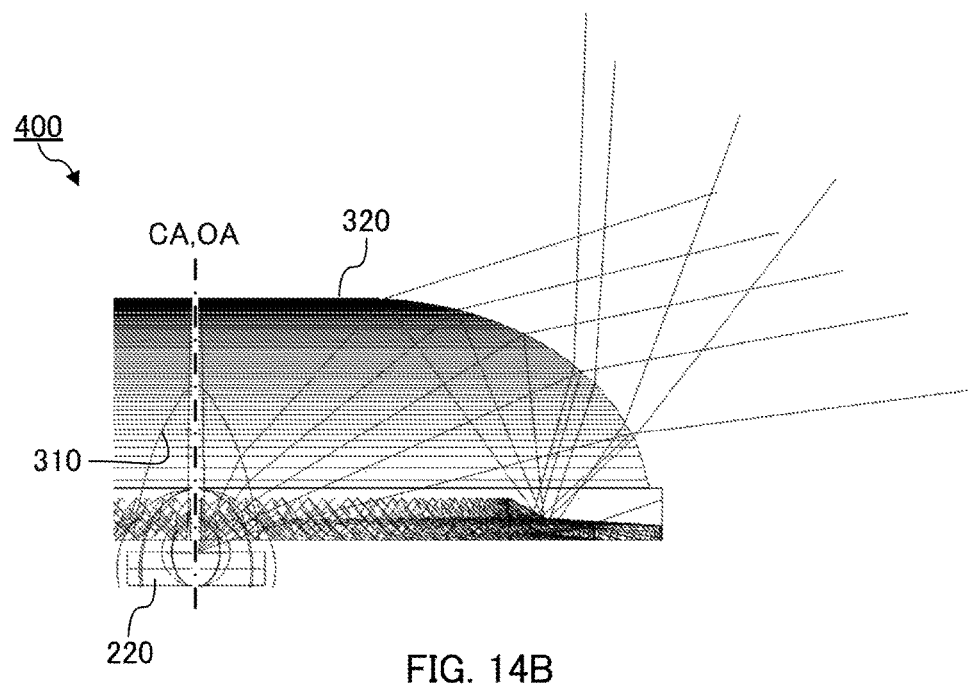

FIGS. 14A and 14B illustrate light paths of light emitted from light emitting element 220 in light flux controlling members 400 and 500. FIG. 14A illustrates light paths in light flux controlling member 500 according to the comparative example, and FIG. 14B illustrates light paths in light flux controlling member 400 according to the present embodiment.

As illustrated in FIG. 14A, in light flux controlling member 500 according to the comparative example of Embodiment 1, a part of arrival light at a large angle to the surface of second internal surface 552 is reflected toward a part just above (or an upper part of) light central axis CA (optical axis OA). On the other hand, as illustrated in FIG. 14B, in light flux controlling member 400 according to the modification of the present embodiment, the quantity of the light travelling toward a part just above central axis CA (optical axis OA) is small in comparison with light flux controlling member 500 according to the comparative example. One possible reason for this is that the light corresponding to the arrival light at a large angle to the surface of second internal surface 552 of light flux controlling member 500 according to the comparative example reaches inner second internal surface 433 or outer second internal surface 434, and is then reflected in various directions without being directed toward a part just above (or an upper part of) central axis CA (optical axis OA) Since the inclination angles of inner second internal surface 433 and outer second internal surface 434 to central axis CA are different from each other.

Figure 15:
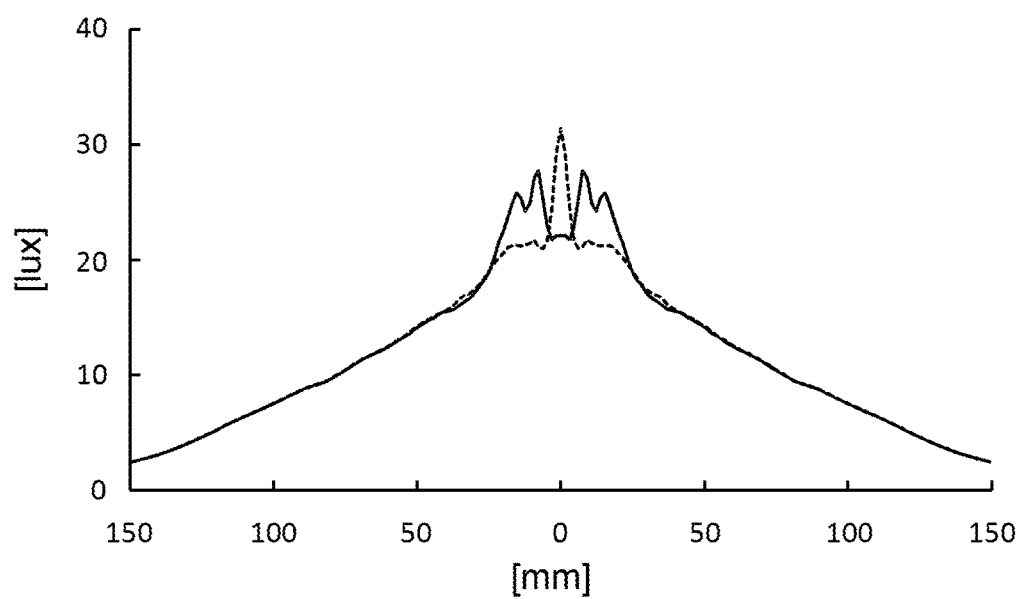
FIG. 15 is a graph showing a simulation of a luminance distribution of the surface light source device.

FIG. 15 illustrates a simulation of a luminance distribution in a surface light source device. In the graph of FIG. 15, the solid line indicates a simulation of a luminance distribution in the surface light source device according to the present embodiment, and the broken line indicates a simulation of a luminance distribution in the surface light source device according to the comparative example. In addition, in the graph of FIG. 15, the ordinate indicates the luminance (lux), and the abscissa indicates the distance (mm) from central axis CA (optical axis OA).

As the broken line indicates in FIG. 15, in the surface light source device according to the comparative example, the inclination angle of second internal surface 534 to central axis CA is constant, and a bright spot is formed in a region around central axis CA (optical axis OA) on the illuminated surface (light diffusion member 120). On the other hand, as the solid line indicates in FIG. 15, in the surface light source device according to the present embodiment, formation of the bright spot in a region around central axis CA (optical axis OA) on the illuminated surface (light diffusion member 120) can be suppressed. One possible reason for this is that a part of light internally reflected at emission surface 320 reaches inner second internal surface 433 or outer second internal surface 434, and is reflected in the lateral direction or a direction away from central axis CA (optical axis OA) without being directed toward the region around central axis CA (optical axis OA).

(Effect)

As described above, in the surface light source device according to the present embodiment, a part of light internally reflected at emission surface 320 is reflected at inner second internal surfaces 333 and 433 or outer second internal surfaces 334 and 434 in various directions. Consequently the quantity of the light travelling toward a part just above light flux controlling members 300 and 400 (light-emitting device) is small, and formation of a bright spot on the illuminated surface (light diffusion member 120) can be suppressed.

It is to be noted that, in light flux controlling member 400 according to the modification of Embodiment 1, even when the inclination angle is increased (or even when the second internal surface is composed of a gentle slope whose angle to a line orthogonal to central axis CA is small), leakage of the light internally reflected at emission surface 320 to substrate 210 can be suppressed with the retroreflection effect of the radial prism shape. For example, even when annular groove part 330 having a relatively small depth is formed at large inclination angles such that inner second internal surface 433 has an inclination angle of 60 degrees and outer second internal surface 434 has an inclination angle of 86 degrees, leakage of the light internally reflected at emission surface 320 to substrate 210 can be appropriately suppressed.

Embodiment 2

A surface light source device according to Embodiment 2 is different from light flux controlling member 300 according to Embodiment 1 in shape of light flux controlling member 600. In view of this, the configurations similar to those of the surface light source device according to the modification of Embodiment 1 are denoted with the same reference signs and the description thereof will be omitted.

(Configuration of Light Flux Controlling Member)

Figure 16A:
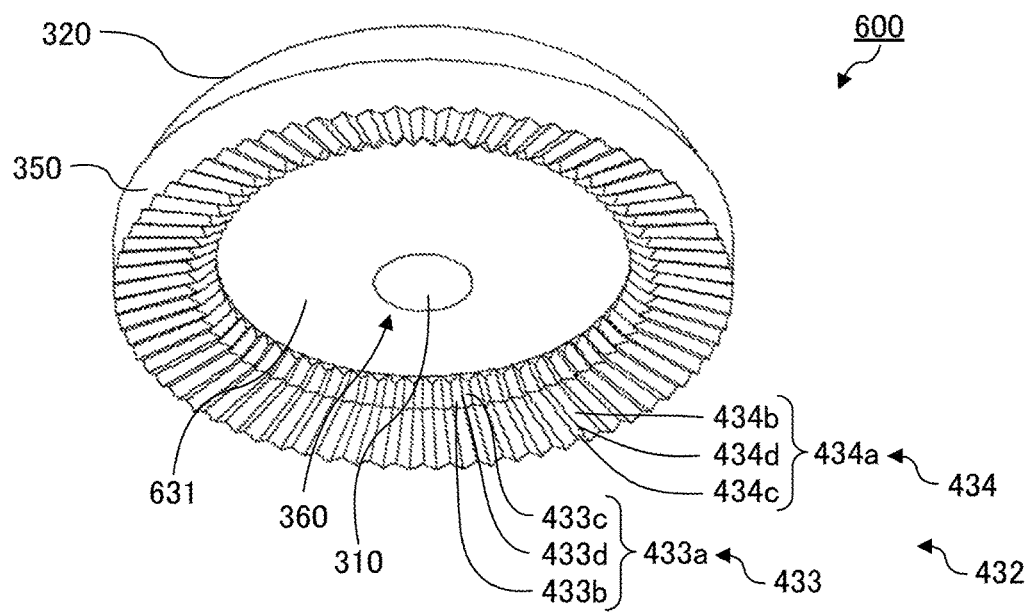
FIGS. 16A and 16B illustrate a configuration of a light flux controlling member according to Embodiment 2.
Figure 16B:
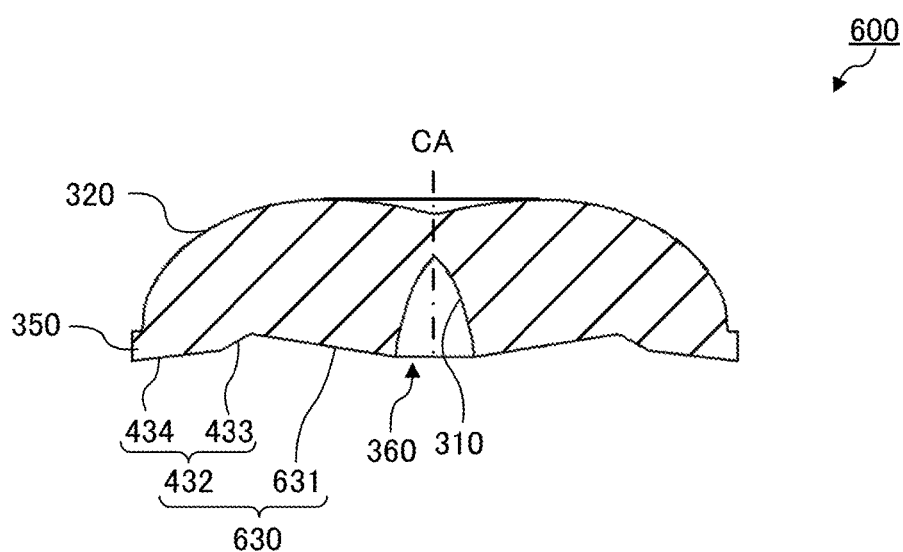
Figure 17:
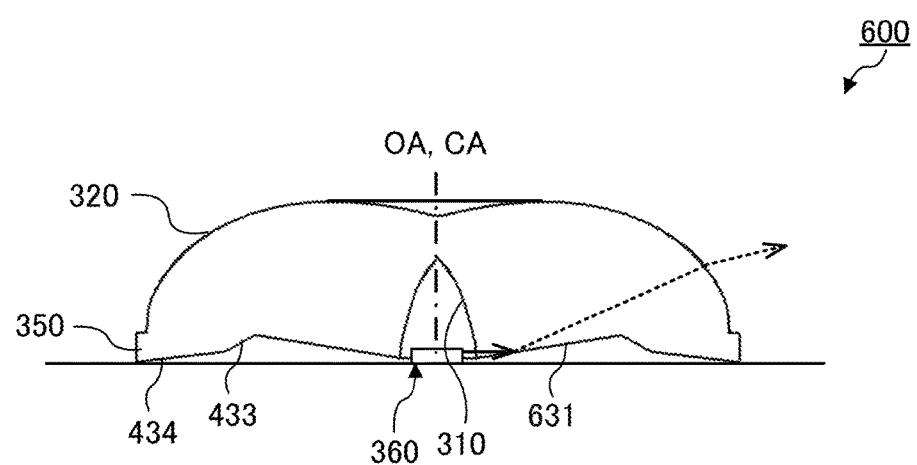
FIG. 17 illustrates light paths of light emitted from a side surface of a light emitting element in a light flux controlling member.

FIGS. 16A and 16B illustrate a configuration of light flux controlling member 600 according to Embodiment 2. FIG. 16A is a perspective view of light flux controlling member 600 according to Embodiment 2 as viewed from the rear side, and FIG. 16B is a sectional view taken along a plane including central axis CA. FIG. 17 illustrates light paths of light emitted from a side surface of light emitting element 220 in light flux controlling member 600. It is to be noted that, in FIG. 17, hatching is omitted to illustrate light paths.

As illustrated in FIG. 16A and FIG. 16B, light flux controlling member 600 according to Embodiment 2 includes incidence surface 310, emission surface 320, annular groove part 630 and flange part 360.

Annular groove part 630 in Embodiment 2 includes first internal surface 631 and second internal surface 432. First internal surface 631 is disposed such that first internal surface 631 approaches the front side as the distance from central axis CA increases. First internal surface 631 may be composed of one curved surface, or a plurality of curved surfaces. In the present embodiment, first internal surface 631 is composed of one curved surface. In the cross section including central axis CA, first internal surface 631 may have a linear shape, or a curved shape protruding toward the rear side. In the present embodiment, in the cross section including central axis CA, first internal surface 631 has a linear shape. That is, in the present embodiment, first internal surface 631 has a shape of a side surface of an inverted truncated conical shape.

Conventionally, the first internal surface of the annular groove part is substantially parallel to central axis CA (see, for example, parallel surface 34 of FIG. 3A to FIG. 4B). Therefore, light advancing in a direction substantially orthogonal to central axis CA is scattered by parallel surface 34 (first internal surface) and inclined surface 32 (second internal surface) toward the upper side of the light flux controlling member. As a result, luminance unevenness has been caused in the surface light source devices using the conventional light flux controlling member. In contrast, in the present embodiment, first internal surface 631 is formed such that first internal surface 631 approaches the front side as the distance from central axis CA increases. With this configuration, the light advancing in a direction substantially orthogonal to central axis CA is not scattered toward the upper side of the light flux controlling member by first internal surface 631 or second internal surface 432. In the present embodiment, the light advancing in a direction substantially orthogonal to central axis CA is reflected or refracted by first internal surface 631 and advanced in the lateral direction of light flux controlling member 600 (see FIG. 17). In this manner, first internal surface 631 suppresses the advancement of the light toward the upper side of light flux controlling member 600, and reduces the luminance unevenness. From the viewpoint of reducing the luminance unevenness due to the above-described reasons, first internal surface 631 is preferably disposed in a region where a large quantity of the light having entered light flux controlling member 300 from incidence surface 310 and advanced in a direction substantially orthogonal to central axis CA reaches.

In particular, when the light emitting element is an LED of COB type, the quantity of the light emitted in the lateral direction of the LED is greater than that of conventional LEDs, and consequently the quantity of the light which advances in a direction substantially orthogonal to central axis CA is also large. Therefore, light flux controlling member 600 of the embodiment of the present invention can further reduce luminance unevenness in comparison with the conventional light flux controlling members when light emitting element is an LED of COB type. It is to be noted that, preferably, from the viewpoint of increasing the quantity of the light which is incident on light flux controlling member 600 after being emitted in the surface direction of the LED, the top surface of light emitting element 220 is located on the upper side relative to the lower end of recess 360 of light flux controlling member 600 in the vertical direction.

Preferably, first internal surface 631 is tilted to a virtual line orthogonal to central axis CA at an angle at which light advancing in a direction orthogonal to central axis CA is reflected toward the lateral side of light flux controlling member 600. In addition, preferably, first internal surface 631 is tilted to the virtual line at an angle at which light reaching first internal surface 631 is totally reflected.

While the entirety of the rear side of light flux controlling member 300 is composed of annular groove part 330 in the present embodiment, annular groove part 630 may be formed only in a part of the region of the rear side of light flux controlling member 600 as long as first internal surface 631 and second internal surface 432 are formed in the above-mentioned region. In this case, in the remaining region of the rear side of light flux controlling member 600, the rear surface is formed.

(Effect)

As described above, in addition to the effect of Embodiment 1, the surface light source device according to the present embodiment can further suppress formation of a bright spot on the illuminated surface (light diffusion member 120) by reflecting, toward the lateral side, the light emitted from the side surface of light emitting element 220.

Figure 18:
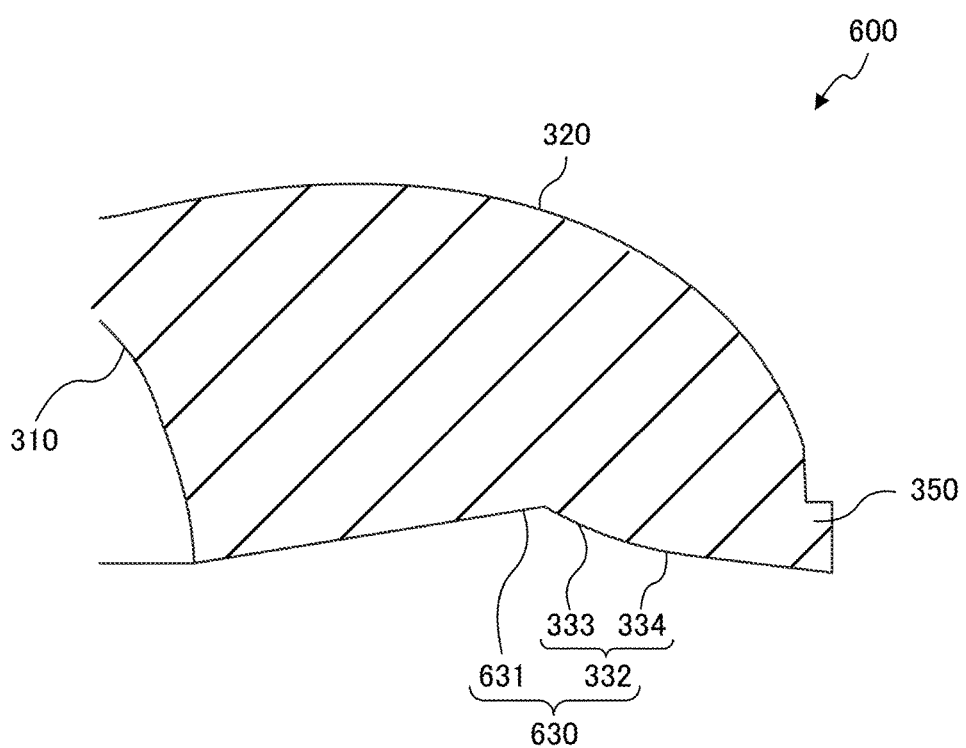
FIG. 18 is a sectional view of a light flux controlling member according to another embodiment.

It is to be noted that, also in the present embodiment, inner second internal surface 333 may have a curved shape protruding toward the rear side in the cross section including central axis CA as illustrated in FIG. 18.

Figure 19:
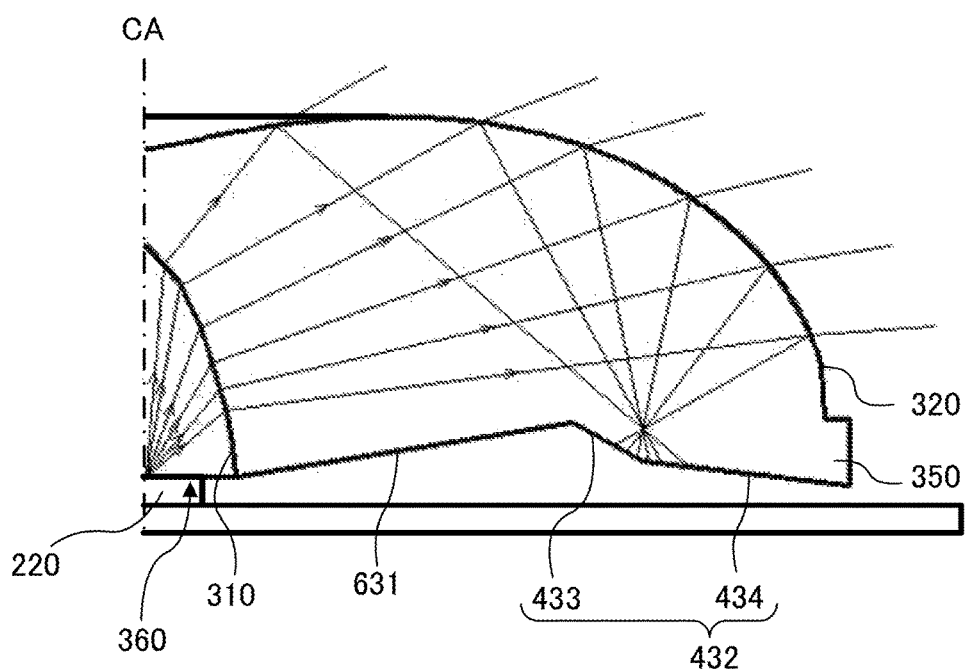
FIG. 19 illustrates light paths of a light flux controlling member in which a condensing position of light internally reflected at a reflection surface is adjusted.

In addition, in the surface light source devices according to Embodiments 1 and 2, the light internally reflected (fresnel-reflected) at emission surface 320 may undesirably condensed in a region around second internal surfaces 332 and 432 (see FIGS. 14A and 14B). In this case, the light condensed in a region around second internal surfaces 332 and 432 may possibly reach the inner second internal surface or the outer second internal surface. In view of this, in light flux controlling members 300, 400, and 600 in the surface light source devices according to Embodiments 1 and 2, it is in some cases difficult to appropriately design second internal surfaces 332 and 432 to reflect light reaching second internal surfaces 332 and 432 in various directions. In view of this, as illustrated in FIG. 19, it is possible to adjust the position at which the light internally reflected (fresnel-reflected) at emission surface 320 is condensed. FIG. 19 illustrates light paths in a light flux controlling member in which the condensing position of the light internally reflected at reflection surface 320 is adjusted. It is to be noted that, in FIG. 19, hatching is omitted to illustrate light paths. As illustrated in FIG. 19, the condensing position of the light internally reflected at emission surface 320 may be adjusted by adjusting the shapes of incidence surface 310 and emission surface 320. In the present embodiment, the position is adjusted to a position where the light is once condensed before the light reaches second internal surface 432. With this configuration, the light internally reflected at emission surface 320 reaches second internal surface 432 over a wide range. The light having reached second internal surface 432 is reflected in various directions, and thus luminance unevenness on light diffusion member 120 can be reduced.

INDUSTRIAL APPLICABILITY

The light flux controlling member, the light-emitting device and the surface light source device of the embodiments of the present invention are applicable to, for example, a backlight of liquid crystal display apparatuses or generally-used illumination apparatuses.

REFERENCE SIGNS LIST

10 Light emitting element
20, 30 Light flux controlling member
22 Incidence surface
24 Emission surface
26 Rear surface
32 Inclined surface
34 Parallel surface
100 Surface light source device
110 Casing
112 Bottom plate
114 Top plate
120 Light diffusion member
200 Light-emitting device
210 Substrate
220 Light emitting element
300, 400, 500, 600 Light flux controlling member
310 Incidence surface
320 Emission surface
320a First emission surface
320b Second emission surface
320c Third emission surface
330, 630 Annular groove part
331, 631 First internal surface
332, 432, 532 Second internal surface
333, 433 Inner second internal surface
334, 434 Outer second internal surface
350 Flange part
360 Recess
370 Rear surface
433a Inner projected line
433b Inner first inclined surface
433c Inner second inclined surface
433d Inner ridgeline
434a Outer projected line
434b Outer first inclined surface
434c Outer second inclined surface
434d Outer ridgeline
534 Projected line
CA Central axis
OA Optical axis

The invention claimed is:

1. A light flux controlling member configured to control a distribution of light emitted from a light emitting element, the light flux controlling member comprising:
an incidence surface on which light emitted from the light emitting element is incident, the incidence surface being an internal surface of a recess formed on a rear side to intersect a central axis of the light flux controlling member;
an emission surface formed on a front side to intersect the central axis, and configured to emit light incident on the incidence surface to outside of the light flux controlling member; and
an annular groove part formed on the rear side to surround the incidence surface, wherein:
the annular groove part includes a first internal surface disposed on the central axis side, and a second internal surface disposed at a position remote from the central axis relative to the first internal surface,
the second internal surface protrudes from a virtual line connecting an outer end portion and an inner end portion of the second internal surface toward a side of an opening of the annular groove part in a cross section including the central axis, and
when an angle on the annular groove part side of two angles between a tangent to an arbitrary point of the second internal surface and the central axis is an inclination angle at the arbitrary point of the second internal surface in the cross section including the central axis,
an inclination angle at the inner end portion of the second internal surface is smaller than an inclination angle at the outer end portion of the second internal surface, and
an inclination angle of the second internal surface increases continuously or stepwise as a distance from the central axis increases.

2. The light flux controlling member according to claim 1, wherein:
the second internal surface includes an inner second internal surface disposed on the central axis side, and an outer second internal surface disposed at a position remote from the central axis relative to the inner second internal surface;
each of the inner second internal surface and the outer second internal surface is a straight line in the cross section including the central axis; and
an inclination angle of the inner second internal surface to the central axis is smaller than an inclination angle of the outer second internal surface to the central axis.

3. The light flux controlling member according to claim 1, wherein the first internal surface is tilted such that the first internal surface approaches a front side as a distance from the central axis increases.

4. A light-emitting device comprising:
a light emitting element; and
the light flux controlling member according to claim 1, wherein:
the central axis coincides with an optical axis of the light emitting element.

5. The light flux controlling member according to claim 4, wherein the light emitting element is a light-emitting diode (LED) of a chip-on-board (COB) type.

6. A surface light source device comprising:
the light-emitting device according to claim 4; and
a light diffusion member configured to allow light from the light-emitting device to pass therethrough while diffusing the light.

7. A display device comprising:
the surface light source device according to claim 6; and
a display member to which light emitted from the surface light source device is applied.

* * * * *